(12) United States Patent
Lannér et al.

(10) Patent No.: US 8,464,242 B2
(45) Date of Patent: Jun. 11, 2013

(54) VIRTUALIZATION OF CONFIGURATION SETTINGS

(75) Inventors: Mats E. Lannér, Portland, OR (US); Christopher L. Gassib, Portland, OR (US); Eric M. Haddan, Camas, WA (US); Laurie A. Hannon, Hillsboro, OR (US); Shawn M. Hempel, Newburg, OR (US)

(73) Assignee: Tranxition Corporation, Jupiter, FL (US)

( * ) Notice: Subject to any disclaimer, the term of this patent is extended or adjusted under 35 U.S.C. 154(b) by 776 days.

(21) Appl. No.: 12/499,643

(22) Filed: Jul. 8, 2009

(65) Prior Publication Data

US 2011/0010700 A1 Jan. 13, 2011

(51) Int. Cl.
*G06F 1/24* (2006.01)
*G06F 9/00* (2006.01)

(52) U.S. Cl.
USPC .......................................... 717/170; 713/100

(58) Field of Classification Search
None
See application file for complete search history.

(56) References Cited

U.S. PATENT DOCUMENTS

| | | | |
|---|---|---|---|
| 6,161,176 A | 12/2000 | Hunter et al. | |
| 6,308,178 B1 | 10/2001 | Chang et al. | |
| 6,357,038 B1 | 3/2002 | Scouten | |
| 6,745,239 B1 | 6/2004 | Hubbard | |
| 6,801,940 B1 | 10/2004 | Moran et al. | |
| 6,871,344 B2 | 3/2005 | Grier et al. | |
| 6,961,765 B2 | 11/2005 | Terry | |
| 6,973,466 B2 | 12/2005 | Kaler et al. | |
| 7,013,331 B2 | 3/2006 | Das | |
| 7,080,159 B2 | 7/2006 | Chu et al. | |
| 7,124,401 B2 | 10/2006 | Muller et al. | |
| 7,194,730 B2 | 3/2007 | Pramberger | |
| 7,287,259 B2 | 10/2007 | Grier et al. | |
| 7,293,170 B2 | 11/2007 | Bowler et al. | |
| 7,318,070 B2 * | 1/2008 | McGee et al. | 1/1 |
| 7,490,318 B2 | 2/2009 | Lu et al. | |
| 2002/0095663 A1 | 7/2002 | Joory | |
| 2003/0004882 A1 | 1/2003 | Holler et al. | |
| 2003/0121024 A1 | 6/2003 | Hill et al. | |
| 2003/0130999 A1 * | 7/2003 | Probert et al. | 707/3 |
| 2003/0177486 A1 * | 9/2003 | Bakke et al. | 717/169 |
| 2004/0193953 A1 | 9/2004 | Callahan et al. | |
| 2004/0220982 A1 * | 11/2004 | Probert et al. | 707/205 |
| 2007/0157172 A1 | 7/2007 | Zenz et al. | |
| 2007/0168493 A1 | 7/2007 | Sarwono et al. | |
| 2007/0220496 A1 | 9/2007 | Kasama | |
| 2007/0240148 A1 | 10/2007 | Inada | |
| 2007/0256056 A1 | 11/2007 | Stern et al. | |
| 2007/0266149 A1 | 11/2007 | Cobb et al. | |
| 2008/0082589 A1 * | 4/2008 | English et al. | 707/203 |
| 2008/0177994 A1 | 7/2008 | Mayer | |

(Continued)

OTHER PUBLICATIONS

U.S. Appl. No. 12/367,718, filed Feb. 9, 2009, Lanner et al.

(Continued)

*Primary Examiner* — Elias Mamo
(74) *Attorney, Agent, or Firm* — Tarek N. Fahmi, APC

(57) ABSTRACT

A hardware and/or software translation system to automatically apply user-specific configuration settings to a computer irrespective of the application version or operation system version for which the settings were originally established. By automatically applying user-specific configuration settings to a version of an application or operating system, the translation system eliminates any post-installation reconfiguration, thereby simplifying the process of changing or upgrading the version of an application or operating system.

8 Claims, 11 Drawing Sheets

U.S. PATENT DOCUMENTS

| | | |
|---|---|---|
| 2008/0201389 A1 | 8/2008 | Cohen et al. |
| 2008/0235611 A1 | 9/2008 | Fraley et al. |
| 2009/0271771 A1 | 10/2009 | Fallows |
| 2010/0205416 A1 | 8/2010 | Lanner et al. |
| 2010/0262952 A1 | 10/2010 | Colton et al. |

OTHER PUBLICATIONS

"mValent Extends Automated Application Configuration Management to Virtualization Environments," http://virtualization.sys-con.com/read543324_p.htm, 2 pages [accessed on Jun. 1, 2008].

"Precision Computing—Discovering Registry Settings—PowerShell and Process Monitor," May 5, 2007, http://www.leeholmes.com/blog/DiscoveringRegistySettingsPowerShellAndProcessMonitor.aspx, 5 pages [accessed Jun. 1, 2008].

Tranxition Corporation; PCT/US2011/20133 file Jan. 4, 2011; International Search Report and Written Opinion dated Apr. 5, 2011, ISA/US; 10 pages.

* cited by examiner

| app ID | version ID | setting ID | type | location |
|---|---|---|---|---|
| 2 | V1 | u_name | REG_BINARY | HKEY_CURRENT_USER\Software\Microsoft\Office\11.0\CommonUserInfo\UserName |
| 2 | V2 | u_name | REG_SZ | HKEY_CURRENT_USER\Software\Microsoft\Office\12.0\CommonUserInfo\UserName |
| 2 | V1 | u_initial | REG_SZ | HKEY_CURRENT_USER\Software\Microsoft\Office\11.0\CommonUserInfo\UserInitials |
| 2 | V2 | u_initial | REG_SZ | HKEY_CURRENT_USER\Software\Microsoft\Office\12.0\CommonUserInfo\UserInitials |
| 1 | V1 | wallp | REG_SZ_EXPAND | HKEY_CURRENT_USER\Software\Microsoft\Windows\Themes\Wallpaper |
| ... | ... | ... | ... | ... |

FIG. 4B

| app ID | setting ID | source version | target version | transform ID |
|---|---|---|---|---|
| 2 | u_name | V1 | V2 | 23 |
| 2 | u_name | V2 | V1 | 34 |
| 2 | u_initial | V1 | V2 | 0 |
| 2 | u_initial | V2 | V1 | 0 |
| 4 | pbd | V1 | V4 | 32 |
| 4 | pbd | V4 | V1 | 88 |
| 1 | wallp | V1 | V2 | 64 |
| 1 | wallp | V2 | V1 | 7 |
| 1 | dtc | V1 | VN | 26 |
| ... | ... | ... | ... | ... |

FIG. 4C

| user ID | app ID | setting ID | data |
|---|---|---|---|
| jack | 2 | u_name | 4e006f0020004e0061006d00 |
| jack | 2 | u_initial | 4e004e000000 |
| olive | 1 | dtw | 0x00000014(20) |
| olive | 1 | wallp | %USERPROFILE%\PIC\martini.jpg |
| jane | 4 | pbd | 1 |
| ... | ... | ... | ... |

FIG. 4D

VIRTUALIZATION OF CONFIGURATION SETTINGS

BACKGROUND

Computer users configure their computers in order to most efficiently and comfortably perform tasks. For example, a user may configure a word processing application to include a footer containing the user's initials in every document created by the user. As another example, a user may configure the mouse to open files with a single click instead of a double click. The footer and mouse configurations are referred to as configuration settings. Some configuration settings are considered global in the sense that all applications executing on the computer share the configuration settings, while other configuration settings are specific to an application or a group of applications. For example, a configuration setting that indicates the base color for a window may be global, whereas a configuration setting that indicates spelling errors are to be automatically corrected may be specific to an application or a group of applications. Typically, both global and application-specific configuration settings are configurable by a user.

In many cases, when a software vendor brings a new version of an application (or operating system) to market, users often choose to continue using outdated versions rather than upgrade their computer to the most recent version of the software. This choice to continue with the status quo is commonly driven by the decrease in productivity and satisfaction that users experience when they are unable to easily return their computer (if at all) to their accustomed, pre-installation operating state. Specifically, when a user installs a new version of an application on his computer, the newly installed version of the application does not include the configuration settings established by the user for the previous version of the application. As a result, the user loses the ease of use provided by his configuration settings, which makes it difficult to use the application. This problem is typically addressed by the user manually reconfiguring the application in the way that he is accustomed. However, this solution tends to be time consuming, tedious, and error prone even for experienced, computer-savvy users. In addition, the difficulty of manually reconfiguring the application may be further exacerbated for the user if the user interface of the new version of the application differs from the previous, user-configured version.

BRIEF DESCRIPTION OF THE DRAWINGS

One or more embodiments of the technology are illustrated by way of example and not limitation in the figures of the accompanying drawings, in which like references indicate similar elements and in which:

FIGS. 4A-4D are table diagrams showing various information that is used by, and/or part of, a translation system in one or more embodiments.

DETAILED DESCRIPTION

Figure 1:
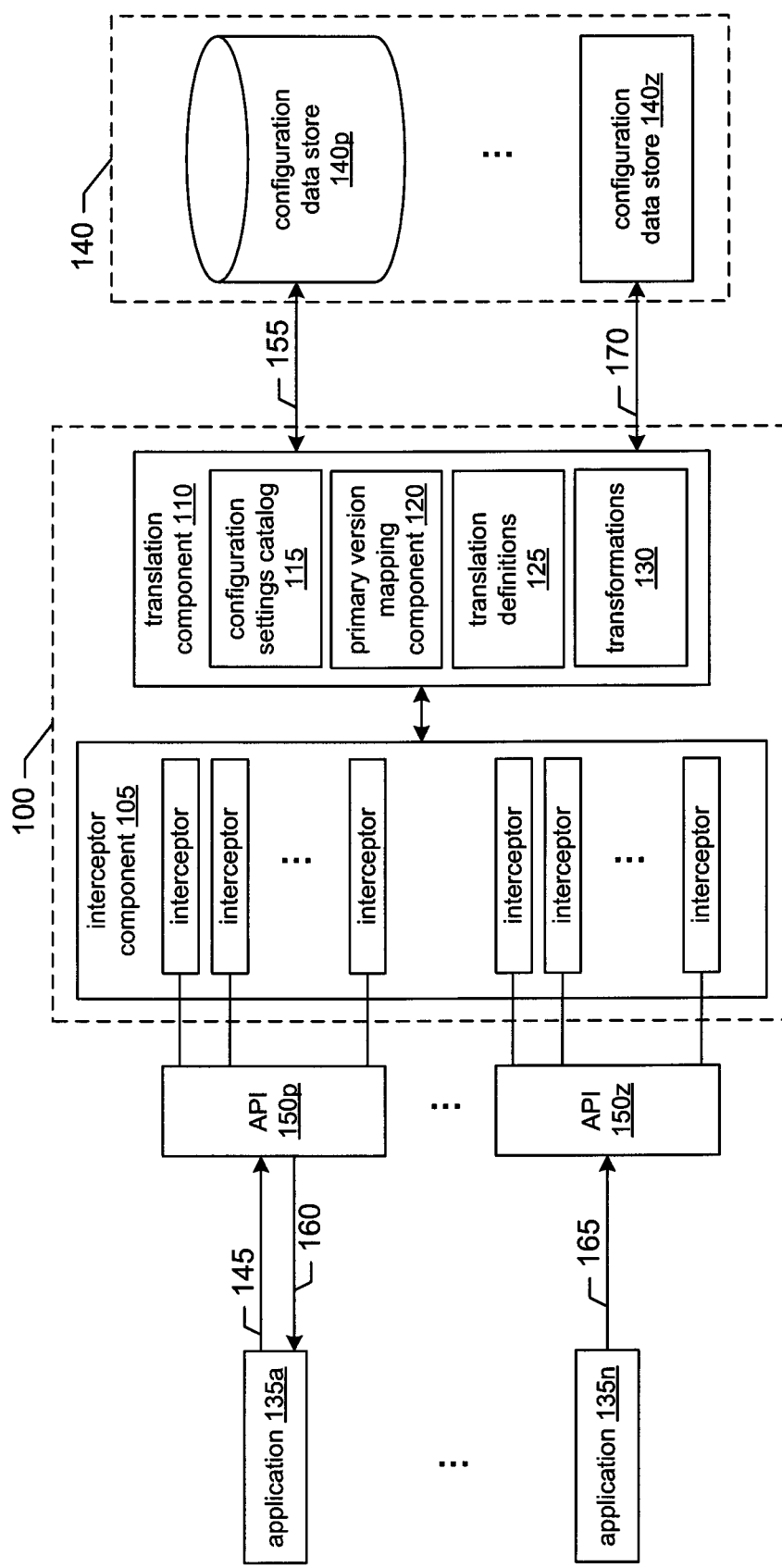
FIG. 1 is a data flow diagram showing how requests for configuration settings are intercepted and processed by a translation system in one or more embodiments.

A translation system is provided that automatically applies configuration settings to a computer irrespective of the application version or operation system version for which the settings were originally established. The translation system maintains a repository of configuration settings that are stored in a primary format. The repository may be a configuration store for a specific version of an application in which the primary format is the version-specific format of the configuration store. For example, the primary format may indicate that a configuration setting is stored at a location expected by a particular version of an application, that the configuration setting is referred to using the name expected by that version of the application, that the value (data) of the configuration setting is the type expected by that version of the application, and so on. As another example, the repository may be a configuration store that is independent of any version of the application or even of any application in which case the primary format may be an intermediate, application independent format, such as XML. To automatically apply configuration settings, the translation system intercepts requests specifying configuration settings that are used by applications and/or system components. In response to intercepting a request to read a configuration setting, the translation system determines whether the version of the requesting application uses a format other than the primary format in which the configuration setting is stored. If the primary format differs from the version-specific format, the translation system translates the requested configuration setting from the primary format to the format of the requesting application. For example, prior to returning the read configuration setting, the translation system may translate the value (data) of the configuration setting from the primary format type (e.g., binary) to the type expected by the version of the requesting application (e.g., string). The translation system may also translate the intercepted request itself. For example, prior to reading the configuration setting, the translation system may translate the intercepted request to read the configuration setting from the location specified by the requesting application to the location specified by the primary format. To facilitate the adoption of a new version of an application, the developer of the version of an application may provide the translation definitions and/or transformations necessary to support translations between the primary format of the repository and the format of the new version. In this way, the translation system allows a user to start using the new version of the application program without having to manually transfer configuration settings to the new version.

By automatically translating configuration settings for one or more versions of an application, the translation system eliminates any post-installation reconfiguration, thereby simplifying the process of changing or upgrading the application. In addition, by automatically translating configuration settings, the translation system enables multiple concurrent installations of an application to use the same configuration data. Additional advantages of the translation system will become apparent as further features of the translation system are described herein.

In some embodiments, the translation system manages a set of configuration settings established by a user and/or an organization for an application. As used herein, the term "application" is used to refer to a single application, a group of applications, an operating system, or the like, for which configuration settings may be established. As such, references to particular applications should not be taken as restrictive. It is noted that the translation system does not need to modify the application code to translate configuration settings between version-specific formats of the application and the primary format. In addition, as used herein, the term "user-specific configuration setting" is used to refer to a configuration setting that has been modified, or is capable of being modified, from a default configuration setting value. User-specific configuration settings may be specific to a single user, a group of users, or a machine. As used herein, the term "default" configuration setting is used to refer to a configuration setting that is undefined or that has been defined by the application manufacturer, and the term "standard" configuration setting is used to refer to a configuration setting that has been defined by an organization for use across a number of computers.

For each configuration setting, the translation system maintains translation definitions that identify the transformations, if any, that may be used to translate an intercepted request and/or a configuration setting from a format used by one version of the application to a format used by another version of the application. As used herein, the term "transformation" is used to refer to a function that converts the attributes of a configuration setting (e.g., the location, name, value (data), type, etc.), configuration setting metadata, and/or the like from one format to another format. That is, a transformation defines how an intercepted request and/or the requested configuration setting is converted from a format used by one version of an application to a format used by another version of the application. For example, a transformation may translate the location specified in an intercepted request to another location. As another example, a transformation may translate a configuration setting's type (e.g., binary) without necessarily changing the underlying value (data) of the configuration setting.

To facilitate description, the following example is provided. Microsoft® Office stores a configuration setting in the system registry of the Microsoft Windows® operating system to indicate the identity of the user operating an application (e.g., Excel, Word, etc.). In both the 2003 and 2007 versions of Microsoft® Office, the name of this configuration setting is "UserName." However, in the 2003 version of Microsoft® Office, the user name configuration setting is a binary type (REG_BINARY) and is stored at: HKEY_CURRENT_USER\Software\Microsoft\Office\11.0\Common\UserInfo, whereas in the 2007 version of Microsoft® Office, the user name configuration setting is a string type (REG_SZ) and is stored at: HKEY_CURRENT_USER\Software\Microsoft\Office\12.0\Common\UserInfo. In this example, the translation system may include a number of transformations to translate intercepted requests for the user name configuration setting. For example, the translation system may include a location mapping transformation that is used to translate the location specified by an intercepted request (e.g., HKEY_CURRENT_USER\Software\Microsoft\Office\11.0\Common\UserInfo) to the location in which the user name configuration setting is actually stored (e.g., HKEY_CURRENT_USER\Software\Microsoft\Office\12.0\Common\UserInfo). Similarly, in this example, the translation system may include a number of transformations to translate the configuration setting type. For example, the translation system may include a data manipulation transformation that is used to translate the value (data) of the user name configuration setting from the type used by the 2003 version of Office (e.g., binary) to the type used by the 2007 version of Office (e.g., string), and vice versa.

In some embodiments, the configuration settings established by a user for an application are managed by the translation system in a format used by a version of the application designated as the primary version. The primary format may be the format expected by the version of the application for which the configuration settings were established by the user, an intermediate format (e.g., XML), a format used by the most widely deployed version of the application, a user-selected format, and so on.

Typically, while an application executes, it makes multiple requests for configuration settings. Such requests are generally directed to one or more configuration data stores that are used by applications and/or operating system components to create, read, update, and/or delete configuration data. The translation system intercepts applications' requests for configuration data. In some embodiments, the translation system intercepts such requests by instrumenting an application programming interface ("API") that is used by the application to access configuration data (e.g., a registry API). As used herein, the term "API" is used to refer to a collection of functions or a single function within a collection. When an application calls an instrumented function of the API, the function transfers control to the translation system.

In some embodiments, when the translation system intercepts a configuration request to read a configuration setting, the translation system determines whether the intercepted request specifies a configuration setting that is managed by the translation system. In some embodiments, the translation system includes a catalog of configuration settings that have been, or may be, established for one or more applications. The translation system may determine whether the intercepted request specifies a configuration setting that is managed by the translation system by searching the configuration settings catalog for the specified configuration setting. If an intercepted request does not specify a configuration setting managed by the translation system, the translation system may transfer control back to the API indicating that the API should continue with its normal processing. If an intercepted request does specify a configuration setting managed by the translation system, the translation system identifies the version of the application from which the request was intercepted and compares the primary format in which the configuration setting is stored to the format expected by the version of the application from which the request was intercepted (referred to herein as the "version-specific format") to determine whether to apply a transform to the intercepted request and/or to the configuration setting.

If the primary format and the version-specific format are the same, the translation system retrieves the configuration setting and returns it to the requesting application. If the primary format differs from the version-specific format, the translation system determines whether it is necessary to translate the intercepted request to a request for the version in which the configuration setting is stored (e.g., the primary format). For example, the location in which the configuration setting is stored by the requesting application may be a different location than that recognized by the primary version of the application. If appropriate, the translation system translates the intercepted request and then retrieves the configuration setting.

In some embodiments, the translation system determines whether the primary format of the attributes of the retrieved configuration setting (e.g., the name, location, value, type, etc.) differs from the version-specific format expected by the version of the application from which the request was intercepted. For example, the configuration setting type (e.g., string, binary, etc.) expected by the requesting application may be different from the type used by the primary version of the application. As another example, the absence of a requested configuration setting may be used to indicate a default value; however, the default value of the primary version of an application may be different from the default value of the version of the application from which the configuration request was intercepted. Likewise, the absence of a configuration setting may be treated differently by different versions of an application (e.g., the primary version may return the default value and another may return an error). If the primary format differs from the version-specific format, the translation system applies one or more transformations to the retrieved configuration setting to convert the configuration setting from the primary format to the version-specific format, and then returns the translated configuration setting. The translation system may use many different techniques to intercept requests for configuration settings. For example, some APIs provide a hooking mechanism through which hooks may be registered to transfer control to the translation system before and/or after an API function is performed.

The translation system may also intercept other types of requests, such as requests to create, update, merge, split, and/or delete a configuration setting. For example, if the translation system intercepts a request to update the value of a configuration setting, the translation system determines whether it is necessary to translate the intercepted request and/or the configuration setting. The translation system compares the primary format in which the configuration setting is stored to the version-specific format specified by the intercepted request. If the primary format and the version-specific format are not the same, the translation system applies a transformation to the intercepted request and/or to the configuration setting to convert the configuration setting from the version-specific format to the primary format prior to storing the updated configuration setting.

Before describing the translation system in greater detail, it is useful to consider an environment in which the translation system can be implemented. FIG. 1 is a data flow diagram showing how requests for configuration settings are intercepted and processed by a translation system in one or more embodiments. In the illustrated embodiment, the translation system 100 includes an interceptor component 105 and a translation component 110. The translation component consists of a configuration settings catalog 115, a primary version mapping component 120, translation definitions 125, and a collection of transformations 130. The translation system resides on a host computing device and serves as an intermediary between applications 135$a$ . . . 135$n$ and their configuration settings, which are stored in configuration data stores 140$p$ . . . 140$z$. The translation system 100 may be used to virtualize configuration settings across a wide variety of computing devices, such as a personal computer, workstations, personal digital assistant, cell phone, digital camera, servers, or other electronic device. As used herein, the term "configuration setting" is used to refer to any application state or preference which is persisted and retrieved by an application. The translation system 100 may reside on the same computing device or a different computing device as the applications 135$a$ . . . 135$n$ and/or the configuration data stores 140$p$ . . . 140$z$. Similarly, one or more of applications 135$a$ . . . 135$n$ may reside on the same computing device or different computing devices. In some embodiments, the translation system 100 includes a configuration settings data store that is used by the translation system in place of configuration data stores 140$p$ . . . 140$z$.

In the illustrated example, the interceptor component 105 intercepts a request 145 made by an application 135$a$ to read a configuration setting via an API 150$p$ from a configuration data store 140$p$. For example, an application such as Microsoft® Excel reads configuration settings controlling various aspects of the programs behavior, such as user name and initials. The application may store these settings in a number of configuration data stores, such as a system registry, a file, network storage, environment variables, or other persistent storage mediums. Typically, these settings are retrieved via an API interface 150 specific to the configuration data store 140. For example, the configuration settings that represent the user name and initials for Microsoft® Excel are stored in the system registry on the Microsoft Windows® operating system. The Microsoft Windows® system registry API includes the following functions (among others) which control reading of data:

RegCreateKey/RegOpenKey( )—retrieve a handle to a registry key

RegGetValue/RegQueryValue( )—retrieve type and value of a registry key

Similarly, other configuration data stores 140, such as a file system, database, or network resource have APIs to read configuration data and metadata. It is noted that a configuration setting may be determined or influenced via metadata returned by an API, such as its absence or presence, one or more of its attributes, or bookkeeping information. For example, if a registry key does not exist, the application may assume a default configuration value.

The translation system may use various techniques to intercept calls to the APIs 150, such as, for example, those described in commonly-owned U.S. Pat. No. 7,293,170 of R. Bowler et al., filed on Oct. 13, 2005 and entitled "CHANGING THE PERSONALITY OF A DEVICE BY INTERCEPTING REQUESTS FOR PERSONALITY INFORMATION," which is hereby incorporated by reference.

In the illustrated example, the interceptor component 105 intercepts the request 145 and then the translation component 110 determines the version of the application from which the request was intercepted. For example, in the Microsoft Windows® operating system, the translation component 110 may call GetModuleFileName to retrieve the full path of the executable followed by a call to GetFileVersionInfo to retrieve a version data structure which can be queried for file (and product) versions. In some embodiments, other file metadata may be used such as creation timestamp, file checksum, etc. In some embodiments, other information may be used to derive the application version, such as by examining calls the application has made, or arguments passed, and so on. In some embodiments, the translation component 110 determines the version of the requesting application when intercepting the first application call and then caches the determined version for subsequent calls intercepted from the application.

In some embodiments, the translation component 110 searches the configuration settings catalog 115 to determine if the request is for a configuration setting managed by the translation system 100. In some embodiments, the translation component makes this determination based on whether there is an entry in configuration settings catalog 115 corresponding to the version of the application from which the request was intercepted and/or the location of the configuration setting indicated by the intercepted request. As used herein, the term "location" is used to refer to a place where a configuration setting resides, such as a registry path, file path, offset within a file, database row, method returning a location (e.g. a calculated location), and so on. It will be appreciated that other methods may be used to determine whether a request pattern is associated with a configuration setting managed by the translation system 100. For example, a registry call to open a key using the sub-key path HKEY_CURRENT_USER\Software\Microsoft\Office\Excel later followed by a call to query the value UserInfo can be canonicalized and described in the configuration settings catalog 115.

In the illustrated example, if it is determined that the request 145 to read a configuration setting is one which matches a configuration setting managed by the translation system 100, the configuration data 155 is retrieved from the configuration data store 140p. As used herein, the term "request" is used to refer to one or more individual API calls, such as, for example, a call to open a registry key followed by a call to query its value, or opening of a file and seeking to a particular offset. In some embodiments, the translation system 100 maintains state information to associate API calls. For example, the translation system 100 may store a handle to a registry key when it intercepts a call to open the registry key for the purpose of associating it with a later call to query a value from the key. Prior to returning the retrieved configuration data, the translation component performs the appropriate transformations on the data, if any.

In some embodiments, if the interceptor component 105 intercepts an API call for a configuration setting that is not managed by the translation system 100, the translation component 110 passes the call through to the API 150 and returns the result. For example, the API 150 may access the configuration data store 140 directly to retrieve the configuration setting. The translation component 110 may record state information related to the call even though the call does not at that time identify configuration data managed by the translation system 100. For example, it may record a handle value when a call is made to open a registry key but return the result to the application unmodified.

When the translation component 110 determines that a call is directly requesting a configuration setting managed by the translation system 100, it uses the primary version mapping component 120, the translation definitions 125, and the transformations 130 to appropriately transform the intercepted request and/or the configuration setting from the primary format to a format expected by the version of the application from which the request was intercepted. By querying the primary version mapping 120 component, the translation component 110 determines the user's primary version for the application. In some embodiments, a user's primary version represents the version format (primary format) in which the user's configuration settings are stored for the application. It is noted that an application may also consist of configuration settings specific to one or more of the user's groups, the machine itself, and/or other categories. The primary version mapping component 120 appropriately contains mappings for each of these types. Thus, while a user's settings may be associated with version 1.0, the machine's settings may be associated with version 2.0. Simultaneously, the running application 135 may be version 3.0.

In some embodiments, the translation component 110 compares the primary format of the configuration setting to the version-specific format used by the version of the application from which the request was intercepted. Typically, when the version-specific format matches the primary format of the configuration setting, no transformation is necessary. When the version-specific format differs from the primary format, the translation component 110 may determine how to translate the requesting application's configuration setting request to a request for the version in which the configuration setting is stored (e.g., the primary version). In some embodiments, the primary version mapping component 120 indicates which translation definition 125 to use. The translation definitions 125 indicate which of the transformations 130 are to be used to convert an intercepted request and/or a configuration request from one version format to another. These transformations 130 may include data manipulation transformations, calls to retrieve data from an alternate location, merging or splitting of data, or a combination of these. A transformation 130 may query the underlying configuration data store 140, and convert the retrieved data from one format to another. For example, a data manipulation transformation may convert the value (data) of a configuration setting from a double word type to a string type. A transformation may be used to map the location of a configuration setting to a different location than that used by requesting application's version. For example, the version mapping component 120 may indicate that application version 2.0's request to retrieve the setting HKEY_CURRENT_USER\application\2.0\wallpaper should use a transformation which indicates the setting should be retrieved from version 1.0 at the location HKEY_CURRENT_USER\application\1.0\wallpaper. This transformation would make a different call to read the underlying configuration data from a location other than the original call, but still return the result in response to the original call. In some embodiments, a transformation 130 may transform metadata or return codes from the call. For example, in the user's primary version of an application, a setting may be defaulted if the key is not present, but in the requesting application's version, the setting is defaulted only if it is empty. In this case, the transformation modifies the result and the return code to simulate an empty key instead of returning an error.

In some embodiments, if the translation component 110 in-is unable to process an intercepted request, the translation component 110 returns an error message to the interceptor component 105 and logs the request and/or other information describing the processing error for later troubleshooting. The translation component 110 may be unable to process a request, for example, if an exception is thrown in response to accessing a configuration setting. In some embodiments, the action taken by the interceptor component 105 in response to a received error message is dependent on the API 150 that was intercepted. For example, the interceptor component 105 may return the appropriate error code to the application. As another example, the interceptor component 105 may return an indication that the intercepted API 150 should continue its normal processing. Typically, an exception is not propagated back to the requesting application.

In the illustrated example, after a transformation 130 (if any) is applied to the request 145 155 to read the configuration setting, the result is returned back to the translation component 110, which applies the appropriate transforms (if any) to the configuration setting attributes (e.g., name, data, etc.). Then, the result is returned back to the interceptor, which returns the configuration data 160 to the requesting application 135a. Thus, the translation system 100 can seamlessly integrate the reading of settings in one version of an application with those stored using a different version.

The translation system 100 may intercept and process other types of requests. For example, in the illustrated example, an application 135n makes a call 165 to an API 150z to store configuration data. As used herein, the term "store" refers to creation, modification, or deletion of a configuration setting.

For example, a program such as Microsoft Excel stores the user name and initials when the user modifies this setting using the Options menu.

In some embodiments, the interceptor component 105 behaves similarly to store requests as it does to read requests. For example, the Microsoft Windows system registry API includes the following functions (among others) which control creating, modifying, and deleting of data:

RegCopyTree( )—copies a registry key, values and sub-keys

RegCreateKey( )—creates and opens a registry key

RegDeleteKey( )/RegDeleteTree( )/RegDeleteValue( )—removes a key, tree, or value RegReplaceKey( )/RegRestoreKey( )/RegSaveKey( )/RegSetValue( )—modifies or creates keys or values In the illustrated embodiment, the interceptor component 105 intercepts the store request 165. The translation component 110 determines the version of the application from which the request 165 was intercepted and searches the configuration settings catalog 115 to determine if the request is for a configuration setting managed by the translation system 100. In the illustrated example, if it is determined that the request 165 to store a configuration setting is one which corresponds to a configuration setting managed by the translation system, the translation component 110 performs the appropriate transformations on the intercepted request and/or the configuration setting, if any.

When the translation component 110 determines that a call is to store configuration data managed by the translation system 100, it uses the primary version mapping component 120, the translation definitions 125, and the transformations 130 to appropriately transform the requesting application's setting to the format of the primary version. The translation component 110 determines how to translate the requesting application's store request 165 to a store request for the primary version. The primary version mapping component 120 indicates which translation definition 125 to use. The translation definitions 125 identify transformations 130 to convert the intercepted request and/or the configuration setting from one version format to another. These transformations 130 may include data manipulation transformations, calls to store data at an alternate location, merging or splitting of data, or a combination of these. For example, the version mapping component 120 may indicate that application version 2.0's request to store the setting HKEY_CURRENT_USER\application\2.0\wallpaper should use a transformation 130 which indicates the setting should be stored in a version 1.0 format at the location HKEY_CURRENT_USER\application\1.0\wallpaper. This transformation 130 (or another) would make a different call to store the underlying configuration data 170 at the translated location and return the result in response to the original call. It is noted that intermediate steps may occur prior to storing the configuration setting. For example, when a registry value is to be created, it may be necessary to first create its parent's keys. In some embodiments, when the primary version mapping component 120 indicates the requesting application version matches the primary version of the stored setting, no transformation is necessary and the call can proceed as normal.

In the illustrated example, after a transformation 130 is applied to the request 165 to store a configuration setting, the result (e.g., return code), if any, is returned back to the interceptor, which returns the result to the requesting application 135n. Thus, the translation system 100 seamlessly translates the storing of configuration settings by one or more versions of an application.

While various embodiments are described in terms of the environment illustrated in FIG. 1, those skilled in the art will appreciate that the translation system 100 may be implemented in a variety of environments including a single, monolithic computer system, a distributed computer system, as well as various other combinations of computer systems or similar devices connected in various ways. In some embodiments, a variety of computing systems or other devices may be used in place of the applications 135a . . . 135n, such as virtual machines, emulators, application servers, communications servers, database servers, file servers, game servers, etc.

Figure 2:
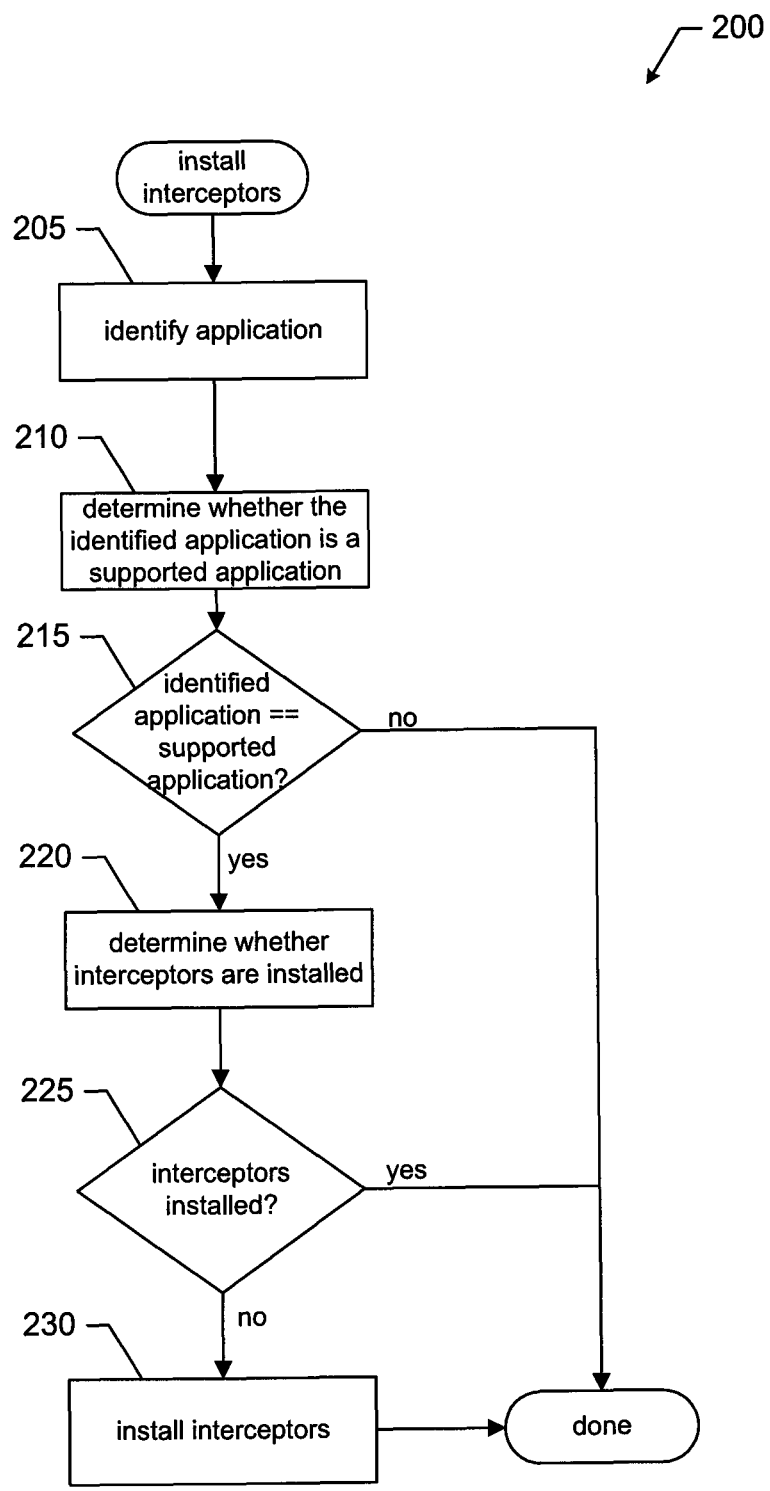
FIG. 2 is a flow chart of a process showing steps performed by a translation system to install interceptors in one or more embodiments.

FIG. 2 is a flow chart of a process 200 showing steps performed by a translation system to install interceptors in one or more embodiments. The install interceptors process 200 is invoked by the translation system 100 before other code of an application is executed. In step 205, the translation system 100 identifies the application that is to execute. In step 210, the translation system 100 determines whether the identified application is a supported application. As used herein, the term "supported application" is used to refer to an application for which the translation system is capable of translating a configuration setting between at least one or more version-specific formats of the application and/or an intermediate format. In step 215, if the identified application is a supported application, then the translation system 100 continues to step 220, else the translation system completes the install interceptors process 200. An application may not have its configuration settings translated by the translation system 100 if, for example, the configuration settings catalog 115 does not include configuration settings for the application or if for some other reason the application is not to have its configuration settings translated. In step 220, the translation system 100 determines whether interceptors have been installed to enable the interceptor component 105 to intercept the identified application's access to configuration settings. In step 225, if interceptors have been installed for the functions or API 150 used by the identified application to access configuration settings, then the translation system 100 completes the install interceptors process 200, else the translation system 100 continues to step 230. In step 230, the translation system 100 installs interceptors for each function or API 150 used by the identified application to access configuration settings; then the translation system 100 completes the install interceptors process 200. For example, the translation system 100 may install the code to intercept the invocation to a function by scanning the code of the address space of the application looking for identifying information (e.g., sequence of instructions) for the function. As another example, the translation system 100 may include an invocation to each function that is not actually executed and derive the location of the function from that invocation as established by the loader. The translation system 100 may use various techniques to install interceptors to intercept requests for configuration settings, such as, for example, those described in commonly-owned U.S. Pat. No. 7,293,170 of R. Bowler et al., filed on Oct. 13, 2005 and entitled "CHANGING THE PERSONALITY OF A DEVICE BY INTERCEPTING REQUESTS FOR PERSONALITY INFORMATION," which is hereby incorporated by reference.

Those skilled in the art will appreciate that the steps shown in FIG. 2 and in each of the following flow charts may be altered in a variety of ways. For example, the order of certain steps may be rearranged; certain sub-steps may be performed in parallel; certain shown steps may be omitted; or other steps may be included; an so on.

Figure 3A:
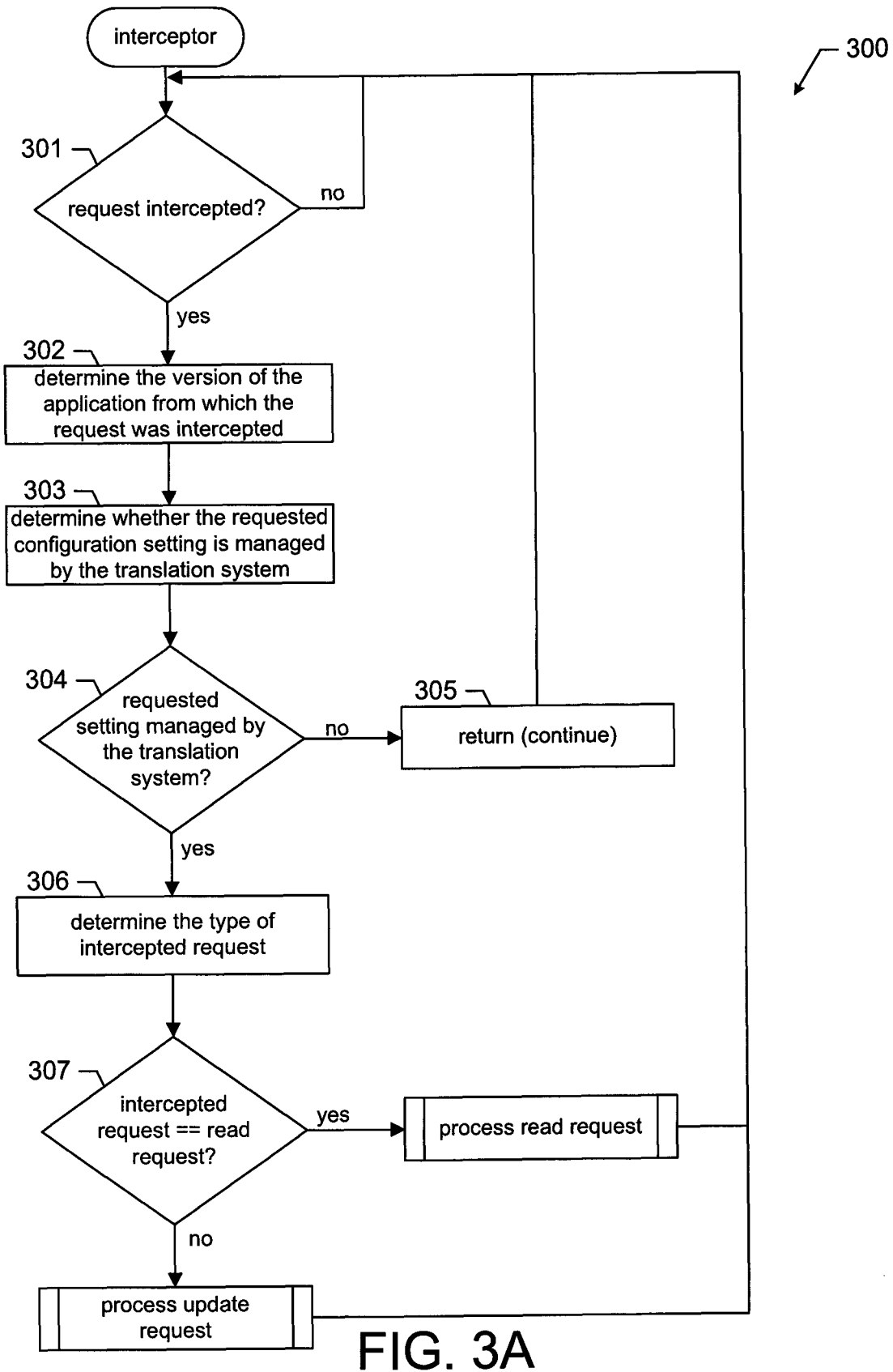
FIGS. 3A-3C are a flow chart of a process showing steps performed by a translation system in response to intercepting a configuration request for a configuration setting in one or more embodiments.
Figure 3B:
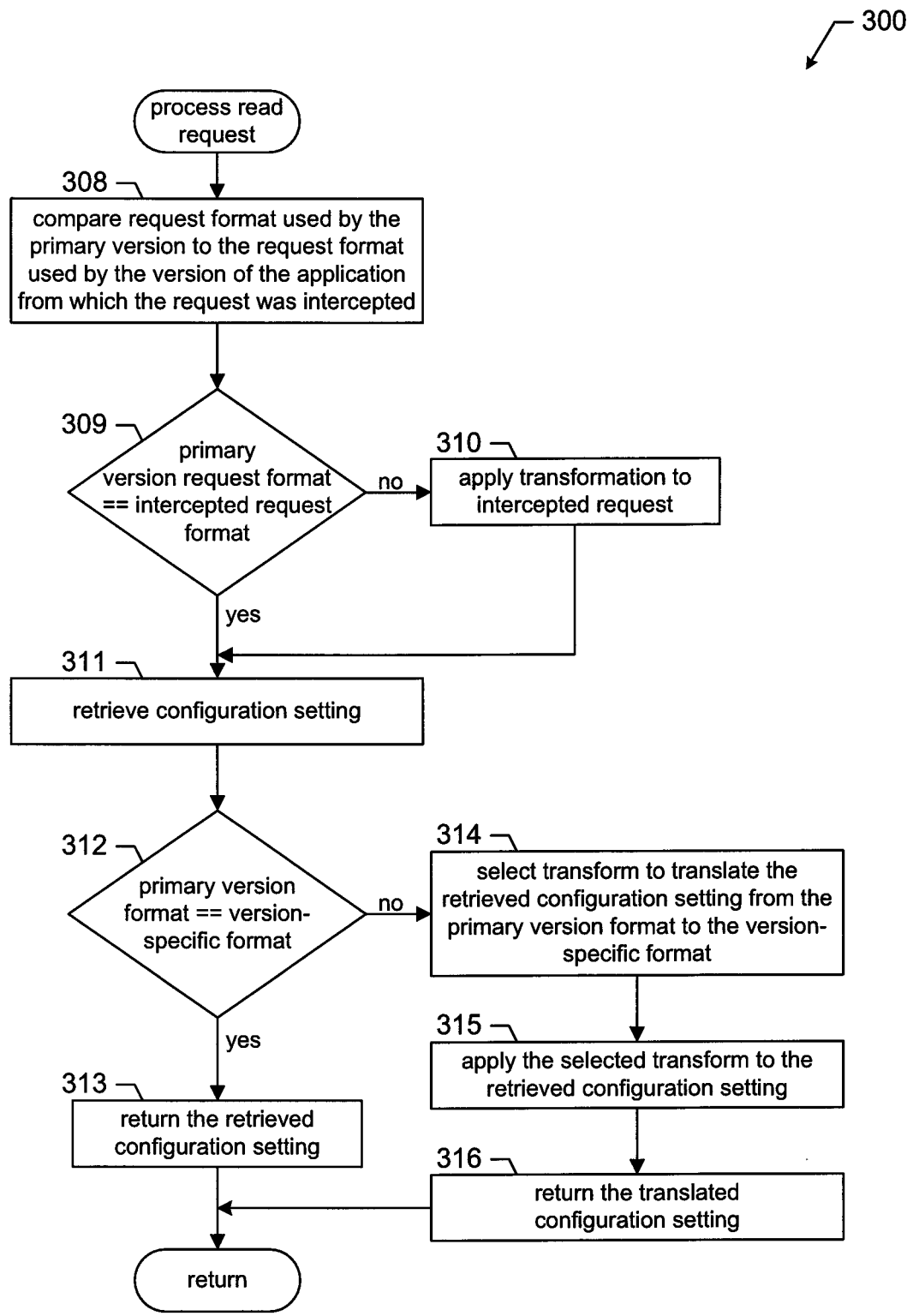
Figure 3C:
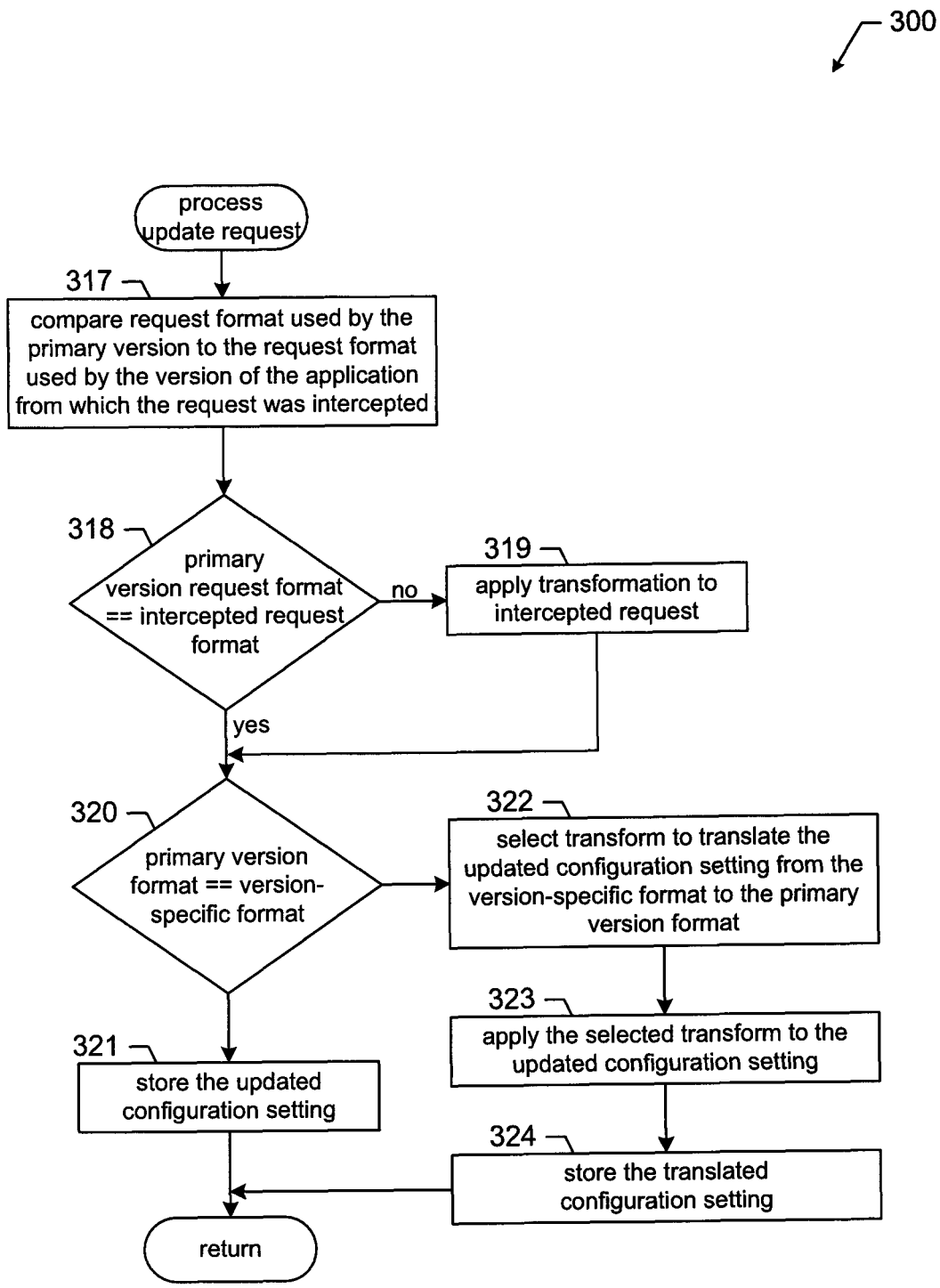

FIGS. 3A-3C are a flow chart of a process 300 showing steps performed by a translation system in response to intercepting a request in one or more embodiment. For example, the interceptor process 300 may be executed when a call to an instrumented API 150 is intercepted by the interceptor component 105. The interceptor process 300 performs the function of the intercepted API 150 by accessing the configuration data store 140 and completing the requested action associated with the configuration setting (e.g., read, update, etc). In step 301, if a request for configuration data is intercepted, then the translation system 100 continues to step 302, else the translation system 100 loops back to step 301. In step 302, the translation system 100 determines the version of the application 135 from which the request was intercepted. In step 303, the translation system 100 determines whether the intercepted request is for configuration data managed by the translation system 100. In some embodiments, to make this determination, the translation system 100 queries a configuration settings catalog 115. If the configuration setting is included in the configuration settings catalog 115, the translation system 100 may determine that it manages configuration setting. For example, each configuration setting may be uniquely identified in the configuration settings catalog 115 by its setting ID, the version of the application from which the request was intercepted and/or the location of the configuration setting indicated in the intercepted request. It will be appreciated that the location may be a string denoting a registry key, a path to a file, a path to a file with an offset, and so on.

In step 304, if the intercepted request is not for configuration data managed by the translation system 100, then the translation system 100 continues to step 305, else the translation system 100 continues to step 306. In step 305, the translation system 100 returns an indication that the intercepted API 150 should continue its normal processing, and then the translation system 100 loops back to step 301. The intercepted API 150 should continue its normal processing, for example, because the configuration setting that the application 135 is requesting is not available for translation. In some embodiments, the translation system 100 may record state information related to the request even though the request does not specify a configuration setting managed by the translation system 100. For example, it may record a handle value when a request is made to open a registry key that is not managed by the translation system 100.

In step 306, the translation system 100 determines the type of the request intercepted. To facilitate description in FIGS. 3A-3C, it is assumed that the type of request intercepted is either a request to read or a request to update a configuration setting. However, it is noted that the translation system 100 may intercept other types of requests (e.g., create, delete, merge, split, etc.) and, if desirable, transform the intercepted request and/or its associated configuration data. In step 307, if the intercepted request is a request to read a configuration setting, then the translation system 100 continues to step 308 to process the read request (FIG. 3B), else the translation system 100 continues to step 317 to process the update request (FIG. 3C).

In step 308, the translation system 100 compares the request format used by the primary version of the application 135 to the request format used by the version of the application from which the request was intercepted. In step 309, if the primary format differs from the intercepted request format, then the translation system 100 continues to step 310, else the translation system 100 continues to step 311. In step 310, the translation system 100 selects a transformation 130 and applies the transformation to the intercepted request to translate the request from the format used by the version of the application from which the request was intercepted to the primary format. In step 311, the translation system 100 retrieves the configuration setting. In step 312, if the primary format of the retrieved configuration setting is the same as the version-specific format expected by the version of the application from which the request was intercepted, then the translation system 100 continues to step 313, else the translation system 100 continues to step 314. In step 313, the translation system 100 returns the retrieved configuration setting to the requesting application. Then the translation system 100 loops back to step 301. In step 314, the translation system 100 selects a transformation 130 to translate the retrieved configuration setting from the primary format to the version-specific format of the version of the application from which the request was intercepted. The translation system 100 may select a transformation 130 by, for example, querying the translation definitions 125 for a transformation 130 corresponding to the configuration setting, the primary format (source format), and the version-specific format (target format). In step 315, the translation system 100 applies the selected transformation 130 to the retrieved configuration setting. In step 316, the translation system 100 returns the translated configuration setting to the requesting application. Then the translation system 100 loops back to step 301.

In step 317, the translation system 100 compares the request format used by the primary version of the application 135 to the request format used by the version of the application from which the request was intercepted. In step 318, if the primary format differs from the intercepted request format, then the translation system 100 continues to step 319, else the translation system 100 continues to step 320. In step 319, the translation system 100 selects a transformation 130 and applies the transformation 130 to the intercepted request to translate the request from the format used by the version of the application from which the request was intercepted to the primary format. In step 320, if the version-specific format of the updated configuration setting is the same as the primary format, then the translation system 100 continues to step 321, else the translation system 100 continues to step 322. In step 321, the translation system 100 stores the updated configuration setting. In step 322, the translation system 100 selects a transformation 130 to translate the updated configuration setting from the version-specific format to the primary format in which the configuration setting is stored. In step 323, the translation system 100 applies the selected transformation 130 to the updated configuration setting. In step 324, the translation system 100 stores the translated configuration setting. Then the translation system 100 loops back to step 301.

Figure 4A:
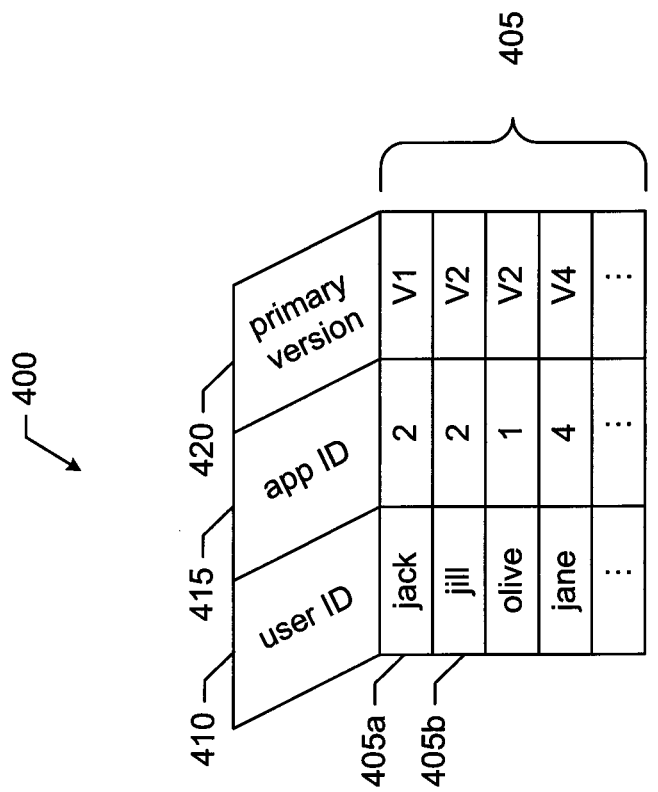

FIGS. 4A-4D are table diagrams showing various information that is used by, and/or part of, a translation system. FIG. 4A and each of the table diagrams discussed herein show a table whose contents and organization are designed to make them more comprehensible by a human reader. Those skilled in the art will appreciate that actual data structures used by the translation system 100 may differ from the tables shown. For example, they may be organized in a different manner; may contain more or less information than shown; may be compressed and/or encrypted; and so on.

FIG. 4A is a table diagram showing sample contents of a primary version table 400 that identifies the primary version of one or more applications for a user. In some embodiments, the primary version table 400 is used by the primary version mapping component 120 to determine the primary version of an application for a user. A user's primary version may represent the version format in which the user's configuration settings are stored for the application. The primary version table 400 includes one or more entries 405. Each entry 405 may correspond to a single user, a group of users, a machine, and so on. Each entry 405 is divided into fields which contain information reflecting a user's primary version of an application. In the illustrated embodiment, each entry includes a user ID field 410 that identifies a user; an application ID field 415 that identifies an application; and a primary version field 420 that identifies the primary version of the application for that user. It is noted that the primary version of an application may be different for different users. For example, in the illustrated embodiment, entry 405a indicates that Jack's primary version of an application is V1, while entry 405b indicates that Jill's primary version of the same application is V2.

FIG. 4B is a table diagram showing sample contents of a configuration settings catalog 115 that identifies, for each version of an application, the configuration settings managed by the translation system 100 in one or more embodiments. In the illustrated embodiment, the configuration settings catalog 115 includes one or more entries 425. Each entry 425 corresponds to a configuration setting used by a particular version of an application. Each entry 425 is divided into fields which contain information reflecting the version-specific format of the configuration setting expected by that version of the application. In some embodiments, the format of a configuration setting is represented by the type, location, name, value (data), configuration metadata, or any combination of these elements. In the illustrated embodiment, each entry includes an application ID field 415 that identifies an application; a version ID field 430 that identifies a version of the application; a setting ID field 435 that identifies a configuration setting of the application; a type field 440 that identifies the configuration setting type expected by the corresponding version of the application; and a location field 445 that identifies the location at which the corresponding version of the application stores the configuration setting. In the illustrated embodiment, the location field 445 of each entry 425 specifies a registry path. However, the location field 445 may specify other locations, such as, for example, a file path, an offset within a file, a database row, a function to calculate a location, and so on.

In some embodiments, the translation component 110 uses the configuration settings catalog 115 to determine whether a configuration setting that is associated with an intercepted request is managed by the translation system 100. For example, the translation component 110 may determine that a configuration setting is managed by the translation system 100 based on whether there is an entry 425 in configuration settings catalog 115 corresponding to the version of the application from which the request was intercepted and/or the location of the configuration setting indicated by the intercepted request.

In some embodiments, the translation component 110 uses the configuration settings catalog 115 to determine whether the primary version of an application specifies a configuration setting format that differs from the format expected by the version of the application from which a request was intercepted. For example, after the translation component 110 determines the version of the requesting application and the primary version of the application for the user, the translation component 110 may query the configuration settings catalog 115 to determine the configuration setting format expected by the primary version and requesting version of the application. In the illustrated embodiment, entry 425a indicates that version 1 of the application expects the u_name configuration setting to have a binary type (REG_BINARY), while entry 425b indicates that version 2 of the application expects the same configuration setting to have a string type (REG_SZ). Based on the queried format information, the translation component 110 may select one or more transformations to translate the value (data) of the configuration setting from one type to another (e.g., a binary-to-string transformation). In the current example, the translation component 110 may also apply transformations to translate the intercepted request. For example, if the primary version is version 1 and the intercepted request is received from version 2, the translation component may apply a location mapping transformation to translate the request to indicate the location 445 specified by entry 425a.

In some embodiments, the translation component 110 uses a translation definition 125 to determine whether the primary version of an application specifies a format that differs from the format expected by the version of the application from which the request was intercepted. FIG. 4C is a table diagram showing sample contents of a translation definitions table 450, in one or more embodiments. In the illustrated embodiment, the translation definitions table 450 identifies, for each configuration setting, a transformation to translate the configuration setting from a source format (e.g., the primary format) to a target format (e.g., a version-specific format). The existence of a transformation may be used to indicate that the primary format differs from the version-specific format. In the illustrated embodiment, the translation definitions table 450 includes one or more entries 455. Each entry 455 corresponds to a configuration setting of an application. Each entry 455 is divided into fields which contain information identifying a source version, a target version, and a transformation for translating the configuration setting between the corresponding source and target versions of an application. In the illustrated embodiment, each entry includes an application ID field 415 that identifies an application; a setting ID field 435 that identifies a configuration setting of the application; a source version field 460 that identifies the format of the configuration setting from which the configuration setting is translated; a target version field 465 that identifies the format of the configuration setting to which the configuration setting is translated; and a transform ID field 470 that identifies a transformation 130 capable of translating an intercepted request and/or a configuration setting from a format used by the source version 460 to a format used by the target version 465. In some embodiments, when the format of a configuration setting is the same for both the source and target versions of an application, the translation definitions table 450 stores an indication that no transformation is necessary to complete an intercepted request for that configuration setting. For example, in the illustrated embodiment, entries 455a and 455b each list a transform ID 470 of zero, indicating that no transformation is necessary for the u_initial configuration setting when the source version of the application is V1 and the target version is V2, and vice versa.

In some embodiments, the translation system includes, or interacts with, an authoring component to generate translation definitions entries 455. The authoring component may be used to observe and analyze an application's access to configuration data and/or the application's run-time behavior to identify which accessed configuration settings correspond to standard and/or user-specific configuration settings. The authoring may use various techniques to identify such configuration settings, such as, for example, those described in commonly-owned U.S. patent application Ser. No. 12/367,718 of M. Lanner et al., filed on Feb. 9, 2009 and entitled "AUTOMATIC ANALYSIS OF AN APPLICATION'S RUN-TIME SETTINGS," which is hereby incorporated by reference.

In some embodiments, the authoring component stores an indication of the identified user-specific configuration settings in a configuration data table. FIG. 4D is a table diagram showing sample contents of a configuration data table 475 in one or more embodiments. The configuration data table 475 includes one or more entries 480. In some embodiments, each entry 480 corresponds to a configuration setting established by a user (or an organization) for an application. For example, in the illustrated embodiment, each entry includes a user ID field 410 that identifies a user; an application ID field 415 that identifies an application; a setting ID field 435 that identifies a configuration setting of the application; and a data field 485 that identifies the value of the configuration setting. In some embodiments, the data 485 is stored in the configuration data table 475 in the primary format identified for the user.

In some embodiments, the authoring component determines how each configuration setting in the configuration data table 475 is defined for one or more versions of the application. For example, the authoring component may determine the location at which a configuration setting is stored, the configuration setting name, type, and so on for each version of the application. The authoring component may include a user-interface to receive a request to monitor an application for configuration settings and/or to receive a selection of one or more versions of an application for which translation definitions 455 are to be generated. In some embodiments, to determine how a configuration setting is defined by a selected version of an application, the authoring component launches the selected version of the application and manipulates the configuration setting while monitoring the application's access to the configuration setting. It is noted that the authoring component may be used to manipulate any number of configuration settings. However, to facilitate description, it is assumed that the authoring component separately manipulates each configuration setting. For example, the authoring component may include a script to launch Excel 2003 and set a user name to indicate the identity of a user operating the application. To set the user name, the script launches the application, selects the "Tools" menu, selects the "Options . . . " menu item, selects the "General" tab, enters a name in the "User name" field, and selects the "OK" button. By monitoring the system registry, the authoring component may determine that the Excel 2003 stores the entered name as the value (data) of the UserName registry key, which has a REG_BINARY type (binary format), and which is stored at: HKEY_CURRENT_USER\Software\Microsoft\Office\11.0\UserInfo.

The authoring component may compare the configuration setting attributes for each selected version of the application and identifies one or more transformations 130 that are capable of converting the attributes, if necessary, to and from each selected version. In some embodiments, the authoring component generates a translation definition entry 455 for each selected version of the application as the source version and the other versions as the target versions. The translation definition table 450 may include each generated translation definition entry 455, or a selection of the generated entries 455. For example, the translation definition table 450 may store only those entries 455 whose source version 460 or the target version 465 correspond to a primary version 420 of an application.

In some embodiments, the translation system includes, or interacts with, a settings upgrade component that is used to change the primary version 420 of an application for a user, a group of users, and so on. For example, if the primary format for configuration settings of Microsoft® Excel is the format used by the 2003 version of Excel and a company upgrades its employees' computers within the finance department to Excel 2007, the setting upgrade component may be used to change primary format for those employees' configuration setting from the format used by the 2003 version of Excel to the format used by the 2007 version of Excel. By upgrading the primary version to reflect a newly deployed or installed version of an application, the settings upgrade component improves the run-time performance for those users that use the new version of the application. The settings upgrade component may also change the primary version 420 of the application indicated in the primary version table 400 for the user.

Figure 5:
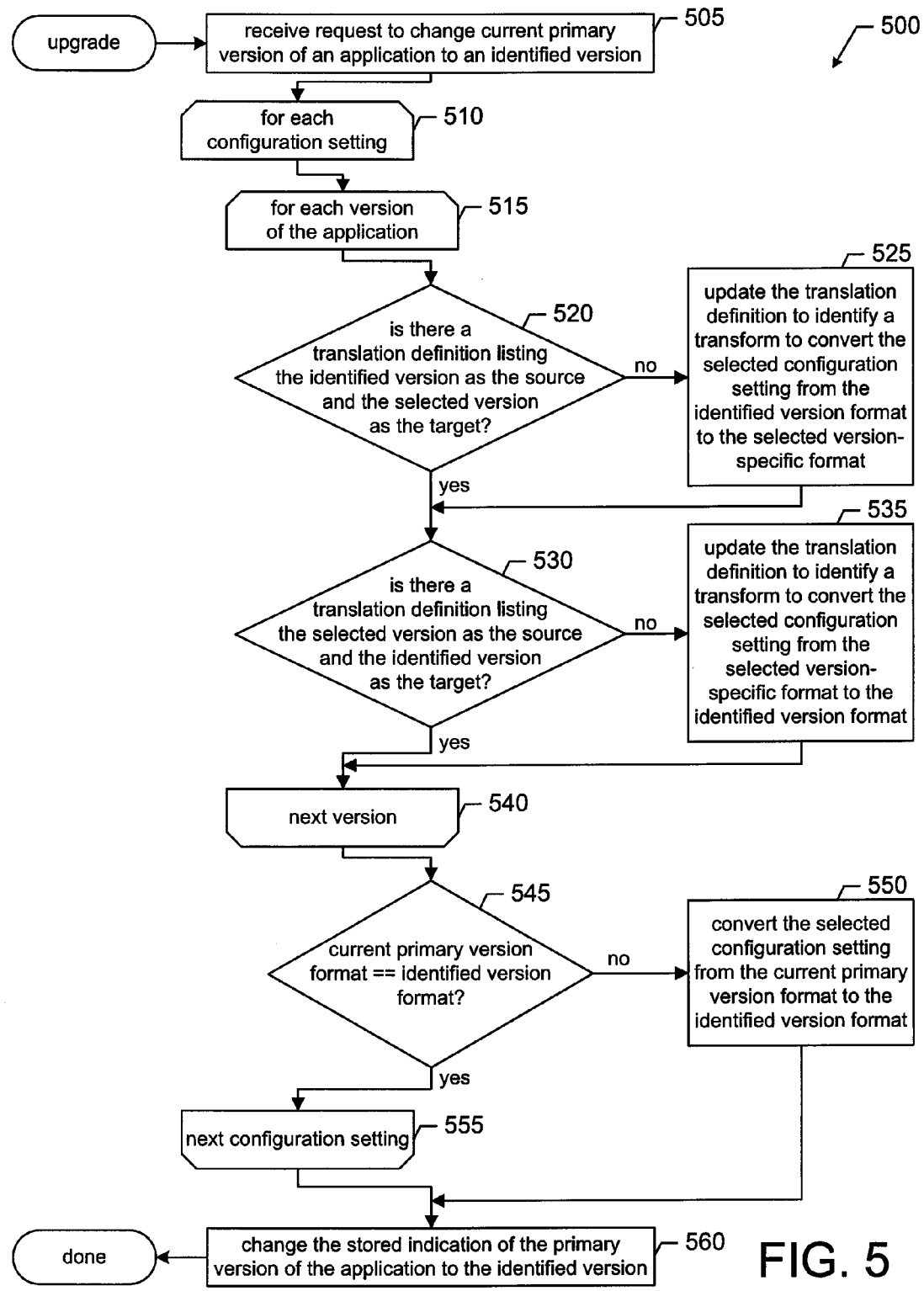
FIG. 5 is a flow chart of a process showing steps performed to upgrade the primary format in which configuration settings are stored for an application in one or more embodiments.

FIG. 5 is a flow chart of a process 500 showing steps performed to upgrade the primary format in which configuration settings are stored for an application in one or more embodiments. The upgrade process 500 may be performed for a single user, for a group of users, and so on. However, to facilitate description of the illustrated embodiment, it is assumed that the upgrade process 500 is performed for a single user.

In step 505, the settings upgrade component receives a request to change the current primary version of an application to an identified version of the application for a user. For example, the settings upgrade component may receive a request to change the current primary version of Excel to Excel 2007 for a user, or group of users, listed in the primary version table 400. The settings upgrade component loops through each configuration setting of the application that is included in the configuration settings catalog 115 in steps 510-555. In some embodiments, the configuration settings catalog 115 may not include entries 425 for the identified version of the application. In such embodiments, the settings upgrade component may call the authoring component to determine the format of each configuration setting in the identified version and/or to generate catalog entries 425 for configuration settings of the application.

In step 510, the settings upgrade component selects a configuration setting. The settings upgrade component loops through each version of the application supported by the translation system for the selected configuration setting in steps 515-540. In step 515, the settings upgrade component selects a version of the application. In step 520, if the translation definition table 450 does not include an entry 455 listing the identified version as the source version 460 and the selected version as the target version 465, then the settings upgrade component continues to step 525, else the settings upgrade component continues to step 530. In step 525, the settings upgrade component updates the translation definition table 450 to identify a transformation 130 to translate the format of the selected configuration setting from the identified version format (source format 460) to the version-specific format of the selected version of the application (target format 465), if any. For example, the settings upgrade component may update the translation definition table 450 by querying the configuration settings catalog 115 to determine the type of the selected configuration setting used by the identified version of the application (e.g., REG_BINARY) and/or the type used by the selected version of the application (e.g., REG_SZ), and then creating an entry 455 that identifies the appropriate transformation 470 (e.g., binary-to-string). In some embodiments, if the format used by the identified version and the selected version are the same, the settings upgrade component updates the translation definition table 450 to include an indication that no transformation is needed to translate the selected configuration setting between the identified version and the selected version of the application. For example, in FIG. 4C, translation definitions entries 455*a* and 455*b* identify that the u_initial configuration setting does not require translation between V1 and V2 of the application.

In step 530, if the translation definition table 450 does not include an entry 455 listing the selected version as the source version 460 and the identified version as the target version 465, then the settings upgrade component continues to step 535, else the settings upgrade component continues to step 540. In step 535, the settings upgrade component updates the translation definition table 450 to identify a transformation 130 to translate the format of the selected configuration setting from the version-specific format of the selected version (source format 460) to the format of the identified version of the application (target format 465), if any. For example, the settings upgrade component may update the translation definition table 450 by querying the configuration settings catalog 115 to determine the type of the selected configuration setting used by the selected version of the application (e.g., REG_SZ) and/or the type used by the identified version of the application (e.g., REG_BINARY), and then creating an entry 455 that identifies the appropriate transformation 470 (e.g., string-to-binary). In step 540, if another version of the application is supported by the translation system, then the settings upgrade component selects the next version and continues at step 515, else the settings upgrade component continues to step 545. In step 545, if the current primary format of the selected configuration setting differs from the format used by the identified version, then the settings upgrade component continues to step 550, else the settings upgrade component continues to step 555. In step 550, the settings upgrade component converts the selected configuration setting from the primary format to the format used by the identified version. In step 555, if any configuration settings of the application have not been upgraded, then the settings upgrade component selects the next configuration setting and continues at step 510, else the settings upgrade component continues to step 560. In step 560, the settings upgrade component changes the stored indication 420 of the primary version of the application from the current primary version to the identified version. Then the upgrade process 500 completes.

Figure 6:
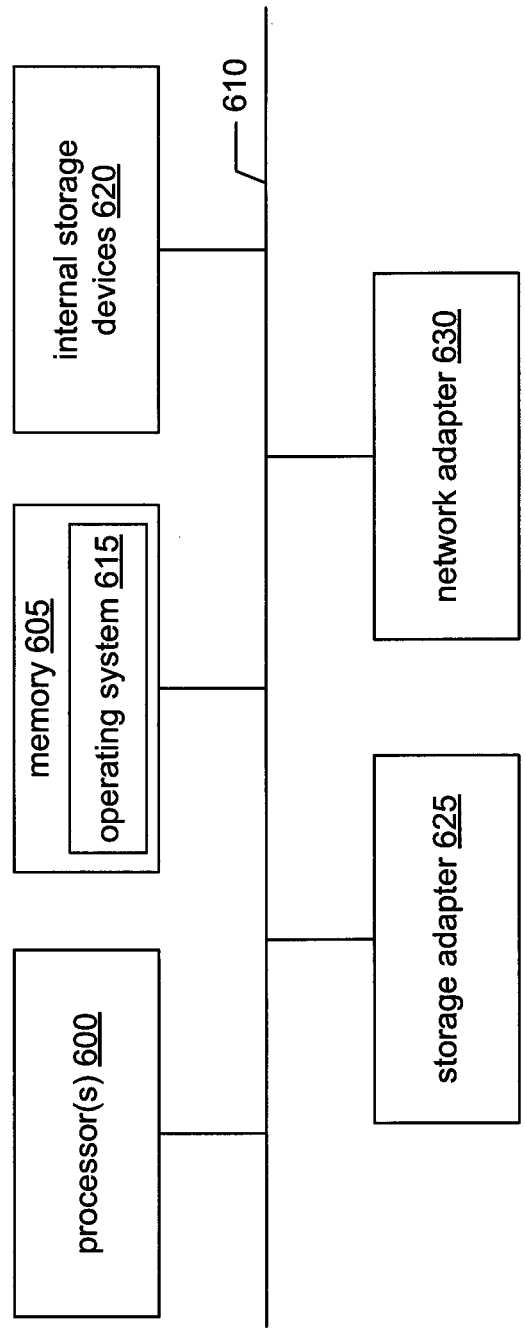
FIG. 6 is a block diagram showing components of a computer on which a translation system executes in one or more embodiments.

FIG. 6 is a block diagram showing components of a computer on which a translation system, a settings upgrade component, and/or an authoring component execute in one or more embodiments. It is noted that certain well-known structures and functions have not been shown or described in detail to avoid obscuring the description. The computer includes one or more processors 600 and memory 605 coupled to an interconnect system 610. The interconnect system 610 shown in FIG. 6 is an abstraction that represents any one or more separate physical buses and/or point-to-point connections, connected by appropriate bridges, adapters and/or controllers. The interconnect system 610 may include, for example, a system bus, a form of Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 600 are the central processing units ("CPUs") of the computer and, thus, control its overall operation. In some embodiments, the processors 600 accomplish this by executing software stored in memory 605. In some embodiments, the computer includes a processor 600 having two or more independent cores in a package composed of a single integrated circuit (referred to as a "die"), one or more dies packaged together, multiple packages, and so on. In some embodiments, the computer includes a hyper-threaded processor that, despite having only a single core, is capable of performing as a multi-core processor. A processor 600 may be, or may include, one or more programmable general-purpose or special-purpose microprocessors, digital signal processors ("DSPs") programmable controllers, application specific integrated circuits ("ASICs"), programmable logic devices ("PLDs"), or the like, or a combination of such devices.

Memory 605 includes the main memory of the computer. Memory 605 includes any form of volatile, nonvolatile, removable, and non-removable computer-readable storage media, or any combination of such media devices that are capable of storing information such as computer-readable instructions, data structures, program modules, or other data. Memory 605 stores (among other things) an operating system 615. The operating system 615 may be a Microsoft Windows® operating system, a Linux operating system, a Mac OS, or the like. It is noted that the translation system, the settings upgrade component, and the authoring component do not depend on the operating system 615 implemented by the computer.

Also connected to the processors 600 through the interconnect system 610 are one or more internal storage devices 620, a storage adapter 625 and a network adapter 630. Internal storage devices 620 may include volatile (e.g., RAM), non-volatile (e.g., ROM, Flash, etc.), removable, and non-removable computer-readable storage media, or any combination of such media devices that are capable of storing information such as computer-readable instructions, data structures, program modules, or other data. It is further noted that the term storage medium may refer to a physical or a virtualized computer-readable storage medium. The storage adapter 625 allows the computer to access one or more storage subsystems and may be, for example, a Fibre Channel adapter, a USB adapter, a SCSI adapter, eSATA adapter, or the like. The network adapter 630 provides the computer with the ability to communicate with remote devices over a network and may be, for example, an Ethernet adapter, a Fibre Channel adapter, or the like.

While computer systems configured as described above are typically used to support the operation of the translation system, the settings upgrade component, and/or the authoring component, those skilled in the art will appreciate that the technology may be implemented using devices of various types and configurations, and having various components. For example, the computer may include one or more input/output (I/O) devices (e.g., keyboard, mouse, microphone, display, printer, etc.) that allow a user to access programs and/or data stored in memory 605 of the computer, even though it is not illustrated as such in FIG. 6.

Thus, a translation system has been described. Although the translation system has been described with reference to specific embodiments, it will be recognized that the translation system is not limited to the embodiments described, but can be practiced with modification and alteration within the spirit and scope of the appended claims. Accordingly, the specification and drawings are to be regarded in an illustrative sense rather than a restrictive sense.

We claim:

1. A method in a computing system to translate a configuration setting used by two or more versions of an application from a primary format to one or more version-specific formats of the application, the method comprising:

storing the configuration setting in the primary format corresponding to a primary version of the application;

storing a translation definition corresponding to the configuration setting, wherein the translation definition includes an indication of a first transform and a second transform for each of the two or more versions of the application when the version of the application uses a version-specific format that differs from the primary format, and wherein each first transform is used to convert the configuration setting from the primary format to the version-specific format and each second transform is used to convert the configuration setting from the version-specific format to the primary format;
intercepting a request from a version of the application for the configuration setting, wherein the intercepted request is a request to create a new configuration setting; and
determining whether the version of the application from which the request was intercepted is the primary version of the application;
when the version of the application from which the request was intercepted is the primary version of the application, performing the intercepted request without applying a transform to the configuration setting; and
when the version of the application from which the request was intercepted is not the primary version of the application, determining whether the intercepted request is a request to read the configuration setting;
if the request is to read the configuration setting, selecting the first transform corresponding to the determined version of the application and applying the selected first transform to the configuration setting to convert the configuration setting from the primary format to the version-specific format;
if the request is not to read the configuration setting, selecting a second transform corresponding to the determined version of the application and applying the selected second transform to the configuration setting to convert the configuration setting from the version-specific format to the primary format,
ascertaining whether the determined version of the application uses a version-specific format that differs from the primary format;
if the version-specific format and the primary format are the same, generating a translation definition corresponding to the new
configuration setting that includes an indication that no first and second transforms exist for the determined version of the application and storing the new configuration setting; and
if the version-specific format differs from the primary format,
identifying a first transform to convert the new configuration setting from the primary format to the version-specific format of the determined version of the application;
identifying a second transform to convert the new configuration setting from the version-specific format of the determined version of the application to the primary format;
applying the identified second transform to the new configuration setting prior to storing the new configuration setting; and
generating a translation definition corresponding to the new configuration setting that includes an indication of the first and second identified transforms,
wherein code implementing the method is stored in memory of the computing system for execution by a processor of the computing system.

2. The method of claim 1 further comprising: for each version of the application other than the determined version, ascertaining whether the version of the application uses a version-specific format that differs from the primary format; if the version-specific format and the primary format are the same, storing an indication that no first and second transforms exist for the version of the application; if the version-specific format differs from the primary format, storing an indication of a first transform corresponding to the version of the application to convert the new configuration setting from the primary format to the version-specific format and storing a second transform corresponding to the version of the application to convert the new configuration setting from the version-specific format to the primary format.

3. The method of claim 1 wherein the primary format is a format used by a version of the application for which the setting was originally established by a user.

4. The method of claim 1 wherein the primary format is an intermediate format that is independent of a version-specific format of the application.

5. The method of claim 1 wherein the primary format is a most widely deployed version of the application within an organization.

6. The method of claim 1 wherein the application is an operating system.

7. The method of claim 1 wherein the application is one application within a group of applications and the configuration setting is applicable to each application within the group of applications.

8. A computer system to translate a configuration setting used by two or more versions of an application from a base format to one or more version-specific formats of the application, the system comprising:
a processor;
a settings storage component that stores, for each of a plurality of configuration settings established for an application by a user, a value of the configuration setting and an indication of a base format in which the value is stored;
a translation storage component that stores transforms to convert the configuration settings between their indicated base format and one or more version-specific formats of the application;
a virtualization component that:
intercepts a request from the application for one of the plurality of the configuration settings, wherein the intercepted request is a request to create a new configuration setting;
determines a version-specific format used by the version of the application from which the request was intercepted; compares the determined version-specific format to the base format; and
completes to the intercepted request, wherein, if the determined version-specific format is a format other than the base format, the virtualization component converts the configuration setting prior to completing the intercepted request by applying a transform, and
a linking component that for each version of the application, determines a version-specific format of the new configuration setting that is used by the version of the application; compares the determined version-specific format to the base format; if the determined version-specific format is the same as the base format, stores an indication that no transforms exist that correspond to the new configuration setting and the version of the application; and if the determined version-specific format is a format other than the base format, identifies a first transform to convert the new configuration setting from the base format to the determined version-specific format; and identifies a second transform to convert the new configuration setting from the determined version-specific format to the base format; and stores an indication of the first and second transforms corresponding to the new configuration setting and the version of the application.

* * * * *